(12) United States Patent  (10) Patent No.: US 9,965,611 B2
Kidron et al.  (45) Date of Patent: May 8, 2018

(54) COMPARING REAL-TIME MOVEMENTS TO PATTERN PROFILE BACKGROUND

(71) Applicant: HEWLETT-PACKARD DEVELOPMENT COMPANY, L.P., Houston, TX (US)

(72) Inventors: Adi Kidron, Yehud (IL); Erez Yaary, Yehud (IL); Yael Keren, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days. days.

(21) Appl. No.: 14/909,547

(22) PCT Filed: Aug. 30, 2013

(86) PCT No.: PCT/US2013/057494
§ 371 (c)(1),
(2) Date: Jun. 30, 2016

(87) PCT Pub. No.: WO2015/030788
PCT Pub. Date: Mar. 5, 2015

(65) Prior Publication Data
US 2016/0300053 A1   Oct. 13, 2016

(51) Int. Cl.
*G06F 21/00* (2013.01)
*G06F 21/36* (2013.01)
(Continued)

(52) U.S. Cl.
CPC ............ *G06F 21/36* (2013.01); *G06F 21/316* (2013.01); *G06F 21/6218* (2013.01);
(Continued)

(58) Field of Classification Search
CPC .... G06F 21/36; G06F 21/316; G06F 21/6218; G06F 2221/2111; G06F 2221/2143; H04W 4/028; H04W 12/12; H04L 63/107
See application file for complete search history.

(56) References Cited

U.S. PATENT DOCUMENTS

| 6,097,938 A | 8/2000 | Paxson |
| 2005/0280557 A1 | 12/2005 | Jha et al. |

(Continued)

FOREIGN PATENT DOCUMENTS

| CN | 103262511 | 8/2013 |
| JP | 2011125053 A | 6/2011 |

(Continued)

OTHER PUBLICATIONS

International Search Report and Written Opinion, PCT Patent Application No. PCT/US2013/057494, dated May 20, 2014, 11 pages.

(Continued)

*Primary Examiner* — Ghodrat Jamshidi

(57) ABSTRACT

Examples of comparing real-time movements to a pattern profile are disclosed. In one example implementation according to aspects of the present disclosure, a method may include receiving, by a computing system, a data stream indicative of real-time movements of a mobile device. The method may further include comparing, by the computing system, the data stream indicative of real-time movements of the mobile device to a pattern profile for the mobile device to determine whether an abnormality occurs in the movement of the mobile device based on a pattern profile, wherein the pattern profile is indicative of historical usage patterns of the movements of the mobile device. The method may also include triggering, by the computing system, an authentication event when an abnormality is determined to occur.

18 Claims, 3 Drawing Sheets

(51) Int. Cl.
  *G06F 21/31*   (2013.01)
  *H04W 4/02*    (2018.01)
  *G06F 21/62*   (2013.01)
  *H04W 12/12*   (2009.01)
  *H04L 29/06*   (2006.01)

(52) U.S. Cl.
  CPC ..... *H04W 4/028* (2013.01); *G06F 2221/2111* (2013.01); *G06F 2221/2143* (2013.01); *H04L 63/107* (2013.01); *H04W 12/12* (2013.01)

(56) References Cited

U.S. PATENT DOCUMENTS

| | | | |
|---|---|---|---|
| 2009/0298468 A1* | 12/2009 | Hsu | H04W 12/12 455/411 |
| 2010/0175116 A1 | 7/2010 | Gum | |
| 2011/0148633 A1 | 6/2011 | Kohlenberg et al. | |
| 2011/0159850 A1* | 6/2011 | Faith | G06Q 30/0201 455/411 |
| 2012/0136572 A1* | 5/2012 | Norton | G01C 21/3407 701/465 |
| 2012/0164978 A1 | 6/2012 | Conti et al. | |
| 2012/0276924 A1 | 11/2012 | Li et al. | |
| 2012/0284779 A1 | 11/2012 | Ingrassia, Jr. et al. | |
| 2013/0055348 A1 | 2/2013 | Strauss et al. | |
| 2013/0102283 A1* | 4/2013 | Lau | H04W 12/06 455/411 |
| 2013/0191908 A1* | 7/2013 | Klein | G06F 21/36 726/18 |
| 2014/0330881 A1* | 11/2014 | Stone | H04L 67/10 709/201 |

FOREIGN PATENT DOCUMENTS

| | | |
|---|---|---|
| JP | 2012105163 | 5/2012 |
| KR | 1244885 B1 | 3/2013 |
| WO | WO-2012093393 A1 | 7/2012 |

OTHER PUBLICATIONS

Jakobsson, M. et al., Implicit Authentication for Mobile Devices, Jul. 17, 2009, 6 pages http://static.usenix.org/event/hotsec09/tech/full_papers/jakobsson.pdf.

Extended European Search Report dated Mar. 21, 2017 for EP Application No. 13892558.1; pp. 37.

* cited by examiner

COMPARING REAL-TIME MOVEMENTS TO PATTERN PROFILE BACKGROUND

CROSS-REFERENCE TO RELATED APPLICATION

This application is a U.S. National Stage Application of and claims priority to International Patent Application No. PCT/US2013/057494, filed on Aug. 30, 2013, and entitled "COMPARING REAL-TIME MOVEMENTS TO PATTERN PROFILE BACKGROUND".

BACKGROUND

Mobile devices such as cellular telephones, smart phones, and tablets have become part of everyday life for millions of people. Users rely on their mobile devices to place calls, keep schedules, send e-mails and messages, capture images, and perform a variety of other tasks. These devices may contain sensitive, secure, and/or confidential information, such as financial information, private photographs and messages, and other data. Moreover, these mobile devices may soon replace credit cards, keys, and identification cards altogether, causing them to store even more sensitive and private information.

BRIEF DESCRIPTION OF THE DRAWINGS

The following detailed description references the drawings, in which.

DETAILED DESCRIPTION

Figure 1:
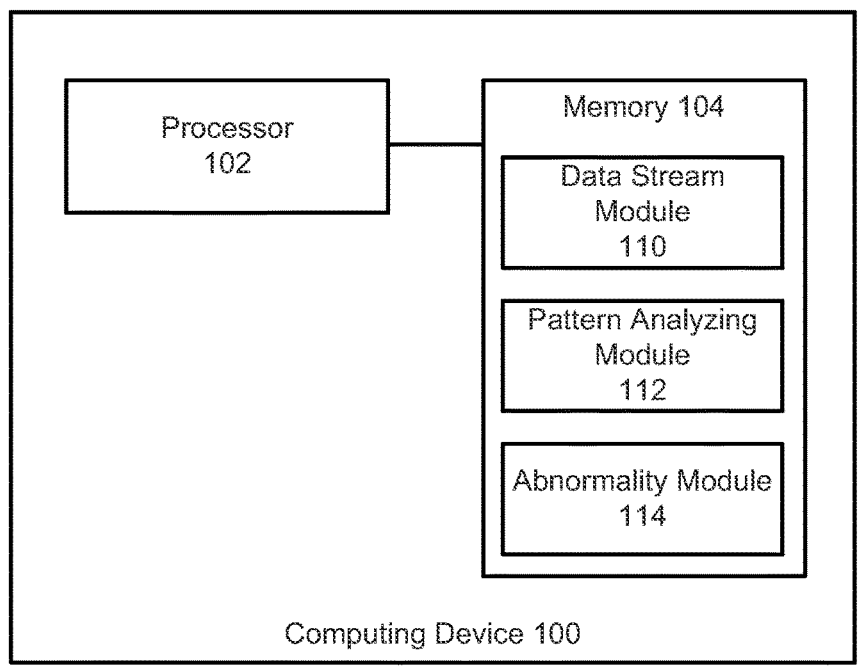
FIG. 1 illustrates a block diagram of a computing device for comparing real-time movements to a pattern profile according to examples of the present disclosure.

As the functionality and wide-spread usage of mobile devices have increased, so too have concerns regarding security and protection of the mobile devices. For example, many mobile devices now include "lock screens" that may appear each time the mobile device is powered on or activated by the mobile device's owner/user. These lock screens enable the owner to enter a pre-selected access code such as a password, numeric code, or pattern to unlock the device. While lock screens do provide some level of security, they often only require a simple four-digit numeric code, for example, to unlock. This enables the owner to access and use his phone quickly; however, it provides only a modicum of security. Some owners elect to disable the lock screen feature altogether. As a result, a lost or stolen mobile device may be easily accessed by a non-owner, who may use the device and/or its content for illicit or improper purposes.

Previously, owners of mobile devices relied on the basic lock screen for security. If the lock screen was disabled or not used by the owner of a mobile device, and then the mobile device was lost or stolen, anyone could access the mobile device and its content. Some applications exist to enable an owner of a mobile device to cause the content of that mobile device to be deleted (or the device locked) remotely once the owner becomes aware that the device is lost. However, in the time between the mobile device is lost and the mobile device's owner causing the mobile device to delete its content or to lock, a thief may have already used the owner's information or disabled the remote security feature of the mobile device.

Various embodiments will be described below by referring to several examples of securing a mobile device based on analyzing patterns of the mobile device. For example a user's to store coal usage and movement patterns may be detected and analyze to create a pattern profile for the user. As long as the movement and use of the mobile device match the pattern profile, the device may remain unlocked and/or the device may utilize only the basic lock screen. When the movement and use of the mobile device do not match the pattern profile, however, the mobile device may activate the lock screen if it is not already in use, may implement a second, higher security access control, or may perform another action such as notifying a user or administrator that the security of the mobile device may be compromised.

In some implementations, the unauthorized use of a device is prevented through the profile pattern-based authentication. Owners of the mobile device may not have to constantly enter a pen or numeric code on the lock screen for example, as long as his movement and usage matches the pattern profile for that user. The pattern profile may also rely on scheduled events such as meetings, flights, commuting time, or other activities to analyze, anticipate, and predict which movements may be expected during different periods of time and may adapt the profile pattern accordingly. Those with disabilities, the elderly, or young children, who may not be able to enter a password or security code, may still implement security authentication. These and other advantages will be apparent from the description that follows.

FIG. 1 illustrates a block diagram of a computing device 100 for comparing real-time movements to a pattern profile for securing a device, such as computing device 100 or another device, according to examples of the present disclosure. It should be understood that the computing device 100 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. Moreover, the computing device 200 may be the mobile device to be analyzed and secured, when appropriate, or may be another computing device to remotely analyze and cause the mobile device to be secured.

The computing device 100 may include a processor 102 that may be configured to process instructions. The instructions may be stored on a non-transitory tangible computer-readable storage medium, such as memory device 104, or on a separate device (not shown), or on any other type of volatile or non-volatile memory that stores instructions to cause a programmable processor to perform the techniques described herein. Alternatively or additionally, the computing device 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The computing device 100 may further include various instructions in the form of modules stored in the memory 104 and executing on the processor 102. In addition to being stored in the memory 104, these modules may be stored in a variety of other suitable memory devices, and/or the functionality of these modules may be executed using specialized circuitry or in other appropriate ways. These modules may include a data stream module 110, a pattern analyzing module 112, and an abnormality module 114. Other modules may also be utilized as will be discussed further below in other examples.

The data stream module 110 receives a data stream indicative of real-time movements of a mobile device such as computing device 100. The real-time movements correspond to the movement of the mobile device. For example, if a mobile device is being transported the owner of the mobile device, the mobile device would produce a data stream indicative of that movement. The mobile device may utilize GPS data, Wi-Fi data, mobile carrier data, accelerometer data, or other similar data to track the movement of mobile device. The mobile device may also detect a lack of movement, indicating that the mobile device remains in a constant location. For example, if the owner of the mobile device places the mobile device on a table or other stationary area, or if the mobile device and its owner are not moving, the mobile device may produce a data stream indicative of the real-time movements of the mobile device being stationary. In the present example, the computing device 100 may be the mobile device which produces the data stream indicative of the real-time movement of the mobile device. Additionally, in the present example, the computing device 100 may be a separate computing device from the mobile device that receives the data stream indicative of real-time movement from the mobile device.

Once the data stream module 110 receives the data stream indicative of real-time movements of a mobile device, the pattern analyzing module 112 may compare the received data stream indicative of the real-time movements of the mobile device to a pattern profile for that mobile device stored in the pattern analyzing module 112. The pattern analyzing module 112, in one example, may receive a pattern profile for the mobile device. However in another example, the pattern analyzing module 112 may create the pattern profile for the mobile device by analyzing the received data stream.

Creating the pattern profile for the mobile device may include creating an historical usage pattern and/or movement rhythms based on previously received data streams from the mobile device. These previously received data streams may be indicative of the real-time movements of the mobile device. For example, as the data stream module 110 receives a data stream indicative of real-time movements from the mobile device, the pattern analyzing module 112 may create the pattern profile based on the received data stream. Because an individual's movement patterns act as an identifier, or fingerprint, of the owner of the mobile device, so too does the pattern profile act as an identifier of the owner of the mobile device. In this way, it can be determined whether the owner of the mobile device is the one using or possessing the mobile device.

The pattern analyzing module 112 analyzes the real-time data stream and the pattern profile to anticipate the movements of the mobile device. In one example, the pattern analyzing module 112 may maintain multiple pattern profiles indicative of various movements such as the mobile device being carried in the mobile device owner's bag, being carried in a user's pocket, and being carried by hand, that will be calculated to divide variations of the same pattern. Over time, the pattern profile may improve or change as the pattern analyzing module 112 better "learns" the anticipated movements and behavior of the mobile device's owner, through continual receiving of the data stream indicative real-time movements of the mobile device.

Once the pattern profile is received or created b the pattern analyzing module 112, the abnormality module 114 may determine whether an abnormality occurs in the movement of the mobile device based on the pattern profile. The abnormality module 114 compares the data stream indicative of real-time movements of the mobile device to the pattern profile. If the data stream indicative of real-time movements of the mobile device is inconsistent with historical usage patterns based on previously recorded data streams indicative of the real-time movements of the mobile device, the abnormality module 114 may detect an abnormality.

In one example, the abnormality module 114 may integrate with data stored on the mobile device, such as electronic man, calendar, online booking systems, or other data to anticipate what the mobile device owner is currently doing. For example if the mobile device owner's schedule indicates that the mobile device owner is currently in a flight, the abnormality module 114 may detect an abnormality if the data stream indicative of real-time movements of the mobile device indicate that the mobile device not being in an "airplane pattern". Such a determination may indicate that the mobile device was stolen from or left behind by the mobile device's owner.

In another example, when integrating with the mobile device's GPS, the abnormality module 114 may detect that mobile device is stationary when the mobile device owner's calendar indicates that the owner should be commuting to work. Such an example may indicate that the mobile device is lost or stolen.

The abnormality module 114 may also trigger an authentication event or cause an authentication event to be triggered when the abnormality is determined to occur. However this may also be accomplished using an authentication module, which is discussed below.

Figure 2:
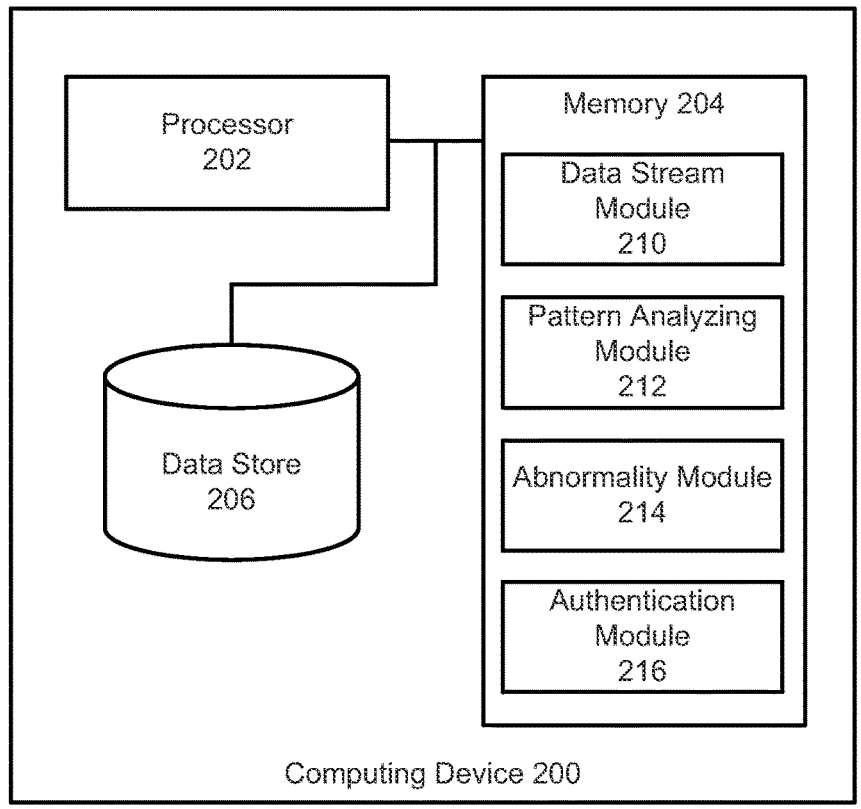
FIG. 2 illustrates a block diagram of a computing device for comparing real-time movements to a pattern profile according to examples of the present disclosure.

FIG. 2 illustrates a block diagram of a computing device 200 for comparing real-time movements to a pattern profile for securing a device, such as computing device 200 or another device, according to examples of the present disclosure. It should be understood that the computing device 200 may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like. Moreover, the computing device 200 may be the mobile device to be analyzed and secured, when appropriate, or may be another computing device to remotely analyze and cause the mobile device to be secured.

The computing device 200 may include a processor 202 that may be configured to process instructions. The instructions may be stored on a non-transitory tangible computer-readable storage medium, such as memory device 204, or on a separate device (not shown), or on any other type of volatile or non-volatile memory that stores instructions to cause a programmable processor to perform the techniques described herein. Alternatively or additionally, the computing device 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

In addition, the computing device 200 may include a data store 206 for storing the pattern profile, for example, and/or other appropriate data. The data store 206 may also store user data, such as contacts, electronic messages, pictures, and other data.

The computing device 200 may further include various instructions in the form of modules stored in the memory 204 and executing on the processor 202. In addition to being stored in the memory 204, these modules may be stored in a variety of other suitable memory devices, and/or the functionality of these modules may be executed using specialized circuitry or in other appropriate ways. These modules may include a data stream module 210, a pattern analyzing module 212, and an abnormality module 214, such as described above with regard to the corresponding modules of FIG. 1. The data stream module 210, the pattern analyzing module 212, and the abnormality module 214 may perform similar functions and behave in similar ways to the corresponding modules of FIG. 1. The computing device 200 may also include an authentication module 216.

The authentication module 216 may cause the computing device 200 (or a mobile device associated with computing device 200) to enter a locked state. For example the computing device 200 may display a lock screen or other type of prompt requesting that the owner of the computing device 200 enter an access code or other type of identifier to access the computing device 200. In one example, this may include displaying a basic lock screen if, for example, the lock screen is disabled or otherwise not used by the owner. However, in another example, a more sophisticated lock screen, such as requiring an alphanumeric entry instead of a basic numeric entry or pattern, may be displayed instead of the basic lock screen. In another example, both a basic lock screen and a more sophisticated lock screen may be displayed, providing a multilayer authentication.

The authentication module 216 may also cause the mobile device to erase all data contained on the computing device 200, including any user data stored in data store 206, in response to the under failing to enter the correct access code. In one example, the owner may have a certain number of attempts to enter the correct access code before the data is erased.

Figure 3:
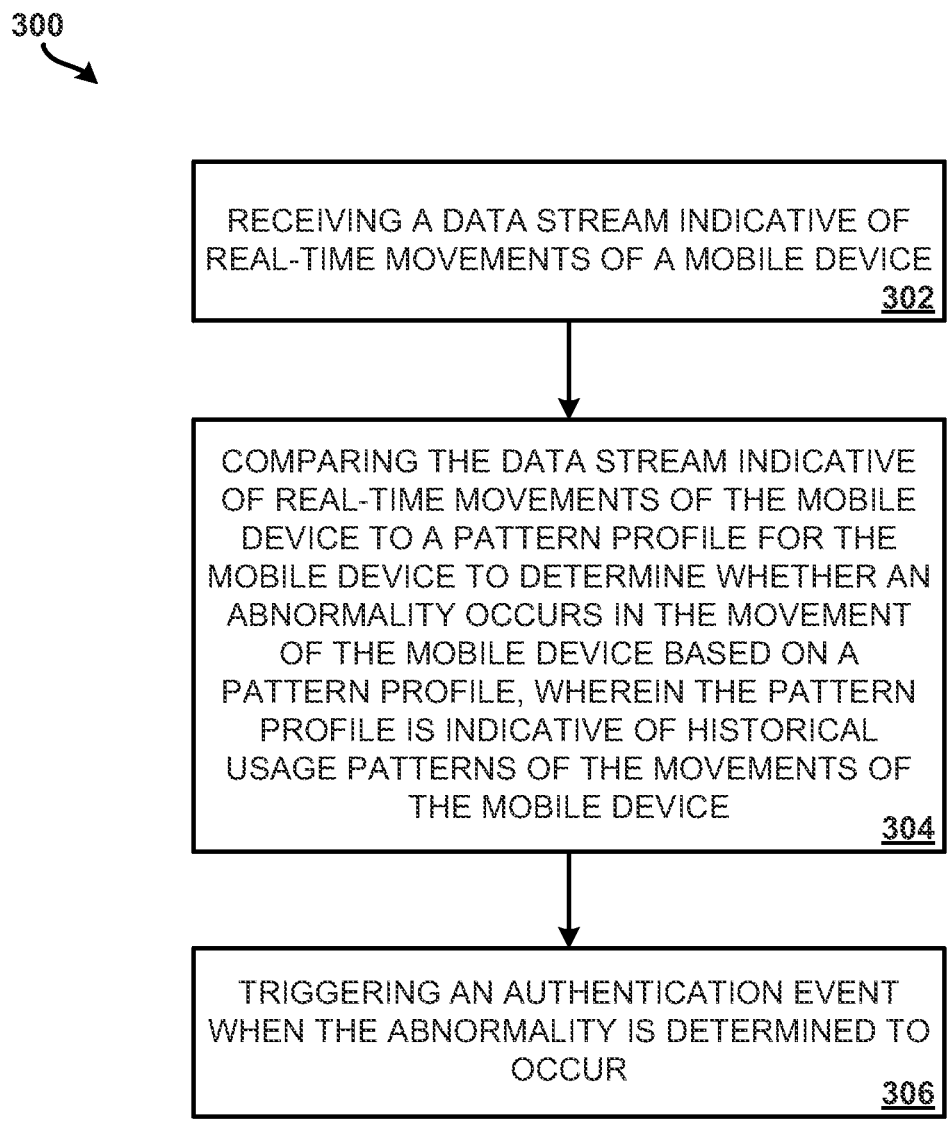
FIG. 3 illustrates a flow diagram of a method for securing a mobile device based on comparing real-time movements to a pattern profile according to examples of the present disclosure.

FIG. 3 illustrates a flow diagram of a method 300 for securing a mobile device based on comparing real-time movements to a pattern profile according to examples of the present disclosure. The method 300 may be executed by a computing system or a computing device such as computing device 100 or computing device 200 of FIGS. 1 and 2 respectively. In one example, the method 300 may include: receiving, by a computing system, a data stream indicative of real-time movements of a mobile device (block 302); comparing, by the computing system, the data stream indicative of real-time movements of the mobile device to a pattern profile for the mobile device to determine whether an abnormality occurs in the movement of the mobile device based on a pattern profile, wherein the pattern profile is indicative of historical usage patterns of the movements of the mobile device (block 304); and triggering, by the computing system, an authentication event when the abnormality is determined to occur (block 306).

At block 302, the method 300 may include receiving, by a computing system, a data stream indicative of real-time movements of a mobile device. The real-time movements correspond to the movement of the mobile device. For example, if a mobile device is being transported the owner of the mobile device, the mobile device would produce a data stream indicative of that movement. The mobile device may utilize GPS data, Wi-Fi data, mobile carrier data, accelerometer data, or other similar data to track the movement of mobile device. The mobile device may also detect a lack of movement, indicating that the mobile device remains in a constant location. For example, if the owner of the mobile device places the mobile device on a table or other stationary area, or if the mobile device and its owner are not moving, the mobile device may produce a data stream indicative of the real-time movements of the mobile device being stationary. The method 300 may continue to block 304.

At block 304, the method 300 may include comparing, by the computing system, the data stream indicative of real-time movements of the mobile device to a pattern profile for the mobile device to determine whether an abnormality occurs in the movement of the mobile device based on a pattern profile, wherein the pattern profile is indicative of historical usage patterns of the movements of the mobile device. For example, the mobile device may compare the data stream to a schedule of events for an owner of the mobile device to determine whether the data stream is consistent or inconsistent with the owner's schedule. If the data stream is inconsistent with the owner's schedule, and abnormality has occurred. If an abnormality is determined to have occurred, the method 300 may continue to block 306.

At block 306, the method 300 may include triggering, by the computing system, an authentication event when the abnormality is determined to occur. In one example, the event triggered when the abnormality is determined to occur may include locking the mobile device so that it cannot be accessed without entering an access code. The event triggered when the abnormality is determined to occur may also include prompting an owner of the mobile device to enter an access code before the mobile device can be used. Additionally, the event triggered when an abnormality is determined to occur may also include causing the mobile device to erase all data contained on the mobile device.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
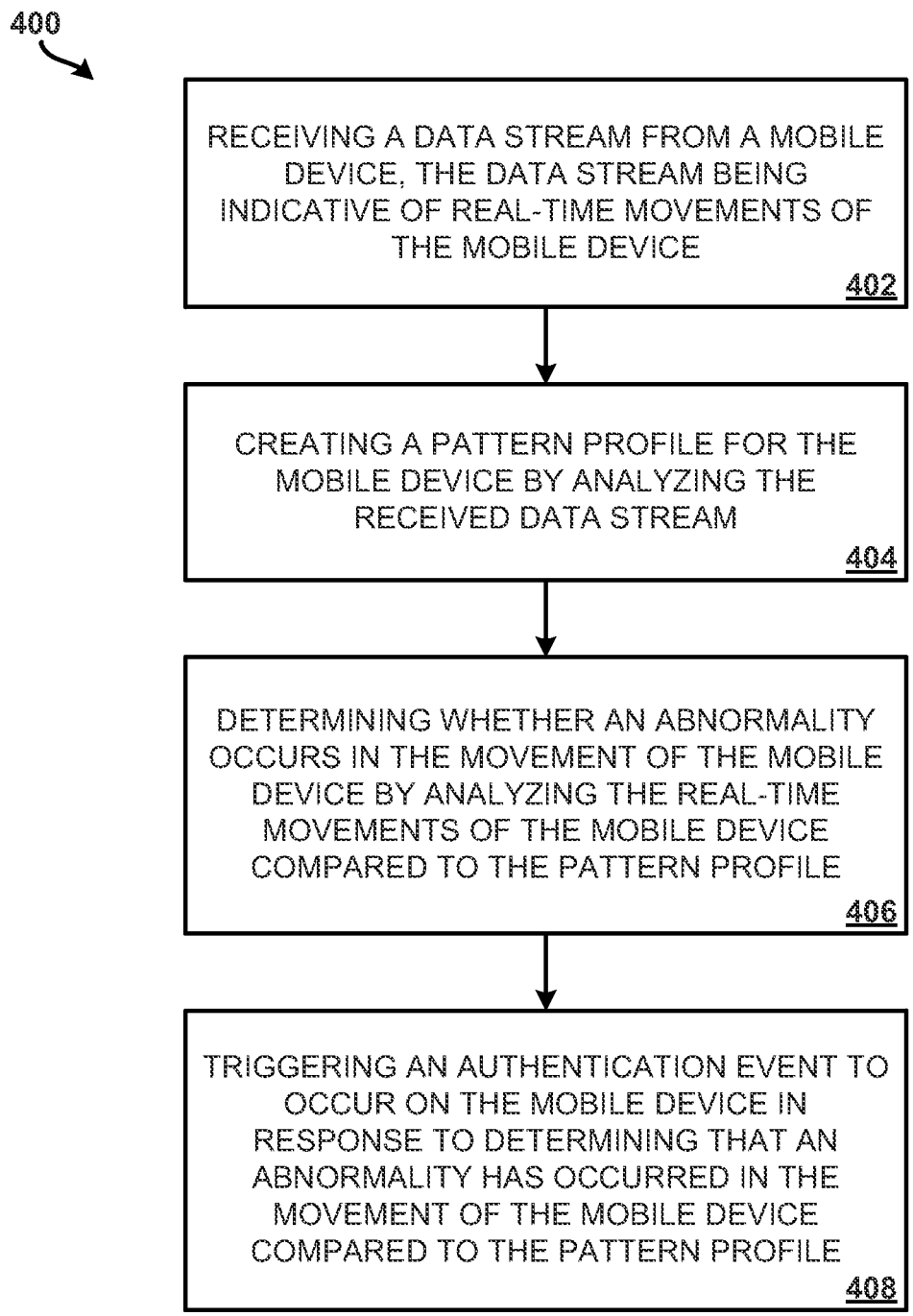
FIG. 4 illustrates a flow diagram of a method for securing a mobile device based on comparing real-time movements to a pattern profile according to examples of the present disclosure.

FIG. 4 illustrates a flow diagram of a method 400 for securing a mobile device based on comparing real-time movements to a pattern profile according to examples of the present disclosure. The method 300 may be executed by a computing system or a computing device such as computing device 100 or computing device 200 of FIGS. 1 and 2 respectively. In one example, the method 400 may include: receiving, by a computing system, a data stream from a mobile device, the data stream being indicative of real-time movements of the mobile device (block 402); creating, by the computing system, a pattern profile for the mobile device by analyzing the received data stream (block 404); determining, by the computing system, whether an abnormality occurs in the movement of the mobile device by analyzing the real-time movements of the mobile device compared to the pattern profile (block 406); and triggering, by the computing system, an authentication event to occur on the mobile device in response to determining that an abnormality has occurred in the movement of the mobile device compared to the pattern profile (block 408).

At block 402, the method 400 may include receiving, by a computing system, a data stream from a mobile device, the data stream being indicative of real-time movements of the mobile device. The real-time movements correspond to the movement of the mobile device. For example, if a mobile device is being transported the owner of the mobile device, the mobile device would produce a data stream indicative of that movement. The mobile device may utilize GPS data, Wi-Fi data, mobile carrier data, accelerometer data, or other similar data to track the movement of mobile device. The mobile device may also detect a lack of movement, indicating that the mobile device remains in a constant location. For example, if the owner of the mobile device places the mobile device on a table or other stationary area, or if the mobile device and its owner are not moving, the mobile device may produce a data stream indicative of the real-time movements of the mobile device being stationary. The method 400 may continue to block 404.

At block 404, the method 400 may include creating, by the computing system, a pattern profile for the mobile device by analyzing the received data stream. Creating the pattern profile for the mobile device may include creating an historical usage pattern based on previously received data streams from the mobile device. These previously received data streams may be indicative of the real-time movements of the mobile device. For example, as the data stream is received from the mobile device, the pattern profile may be created based on the received data stream. The pattern profile may also include historical usage patterns for the mobile device and a schedule of events for an owner of the mobile device. After the pattern profile is created, the method 400 may continue to block 406.

At block 406, the method 400 may include determining, by the computing system, whether an abnormality occurs in the movement of the mobile device by analyzing the real-time movements of the mobile device compared to the pattern profile. For example, the mobile device may compare the data stream to a schedule of events for an owner of the mobile device to determine whether the data stream is consistent or inconsistent with the owner's schedule. If the data stream is inconsistent with the owner's schedule, and abnormality has occurred. Similarly, if the data stream of the mobile device indicates that the owner is walking with the mobile device in a different way than the pattern profile suggests that the owner of the mobile device typically carries the mobile device, and abnormality exist. If an abnormality is determined to have occurred, the method 400 may continue to block 408.

At block 408, the method 400 may include triggering, by the computing system, an authentication event to occur on the mobile device in response to determining that an abnormality has occurred in the movement of the mobile device compared to the pattern profile. In one example, the event triggered when the abnormality is determined to occur may include locking the mobile device an that it cannot be accessed without entering an access code. The event triggered when the abnormality is determined to occur may also include prompting an owner of the mobile device to enter an access code before the mobile device can be used. Additionally, the event triggered when an abnormality is determined to occur may also include causing the mobile device to erase all data contained on the mobile device.

Additional processes also may be included, and it should be understood that the processes depicted in FIG. 4 represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
    receiving, by a processor of a computing system, a data stream indicative of real-time movements of a mobile device;
    forming, by the processor, a movement pattern profile for the mobile device based on historical movements of the mobile device and movement information derived from electronic mail and a calendar of scheduled events, prior to occurrence of the scheduled events, for an owner of the mobile device;
    comparing, by the processor, the data stream indicative of real-time movements of the mobile device to the movement pattern profile for the mobile device including the movement information for the owner of the mobile device to determine whether an abnormality occurs in the movement of the mobile device; and
    in response to a determination that an abnormality in the movement of the mobile device has occurred, triggering, by the processor, an authentication event on the mobile device.

2. The method of claim 1, wherein forming the movement pattern profile further includes integrating movement information derived from online booking systems for the owner of the mobile device with the movement information derived from the electronic mail and the calendar of scheduled events.

3. The method of claim 1, wherein forming the movement pattern profile is further based on movement data derived from online booking systems for the owner of the mobile device.

4. The method of claim 1, wherein triggering the authentication event includes:
    locking the mobile device; and
    prompting a requirement on a display of the mobile device for entry of an access code before allowing the mobile device to be used.

5. The method of claim 4, further comprising:
    causing the mobile device to erase all data contained on the mobile device in response to an entry of a false access code.

6. The method of claim 1, wherein triggering the authentication event includes:
    locking the mobile device; and
    causing the mobile device to erase all data contained on the mobile device.

7. A method comprising:
receiving, by a computing system, a data stream from a mobile device, the data stream being indicative of real-time movements of the mobile device;
creating, by the computing system, a movement pattern profile for the mobile device based on historical movements of the mobile device and movement information derived from a calendar of scheduled events, prior to occurrence of the scheduled events, for an owner of the mobile device;
determining, by the computing system, whether an abnormality occurs in the movement of the mobile device by analyzing the real-time movements of the mobile device compared to the movement pattern profile; and
triggering, by the computing system, an authentication event to occur on the mobile device in response to determining that an abnormality has occurred in the movement of the mobile device compared to the movement pattern profile.

8. The method of claim 7, wherein triggering the authentication event to occur on the mobile device includes causing the mobile device to enter a locked state.

9. The method of claim 8, wherein the locked state displays a prompt on a display of the mobile device for requiring a passcode to be entered before allowing the mobile device to be used.

10. The method of claim 9, further comprising:
erasing data contained on the mobile device in response to an entry of a false passcode.

11. The method of claim 7, wherein creating the movement pattern profile includes creating a historical usage pattern based on previously-received data streams indicative of the real-time movements of the mobile device.

12. The method of claim 7, wherein creating the movement pattern profile is further based on movement information derived from electronic mail and online booking systems for the owner of the mobile device.

13. A system comprising:
a processor; and
a memory storing instructions that when executed by the processor cause the processor to:
receive data from a mobile device, the data being indicative of real-time movements of the mobile device;
create a movement pattern profile for the mobile device based on movement data derived from electronic mail and a calendar of scheduled events, prior to occurrence of the scheduled events, for an owner of the mobile device;
determine whether an abnormality occurs in the movement of the mobile device based on a comparison between the data indicative of real-time movements of the mobile device and the movement pattern profile for the mobile device; and
in response to a determination that an abnormality has occurred, trigger an authentication event on the mobile device.

14. The system of claim 13, further comprising:
a data store to store the movement pattern profile created for the mobile device.

15. The system of claim 13, to trigger the authentication event, the instructions are to cause the processor to lock the mobile device.

16. The system of claim 15, wherein in addition to locking the mobile device, the instructions are to cause the processor to:
display a prompt on the mobile device to require an access code to be entered before allowing the mobile device to be used; and
cause the mobile device to erase all data contained on the mobile device in response to a false access code being entered.

17. The system of claim 13, wherein the instructions are to cause the processor to create the movement pattern profile based on historical real-time movements of the mobile device.

18. The system of claim 13, wherein the instructions are to cause the processor to create the movement pattern profile for the mobile device based on movement information derived from an online booking system for the owner of the mobile device.

* * * * *